Jan. 14, 1930.   A. LIPETZ   1,743,363
MOTOR DRIVING CONNECTION FOR LOCOMOTIVES
Filed Aug. 2, 1928   2 Sheets-Sheet 1
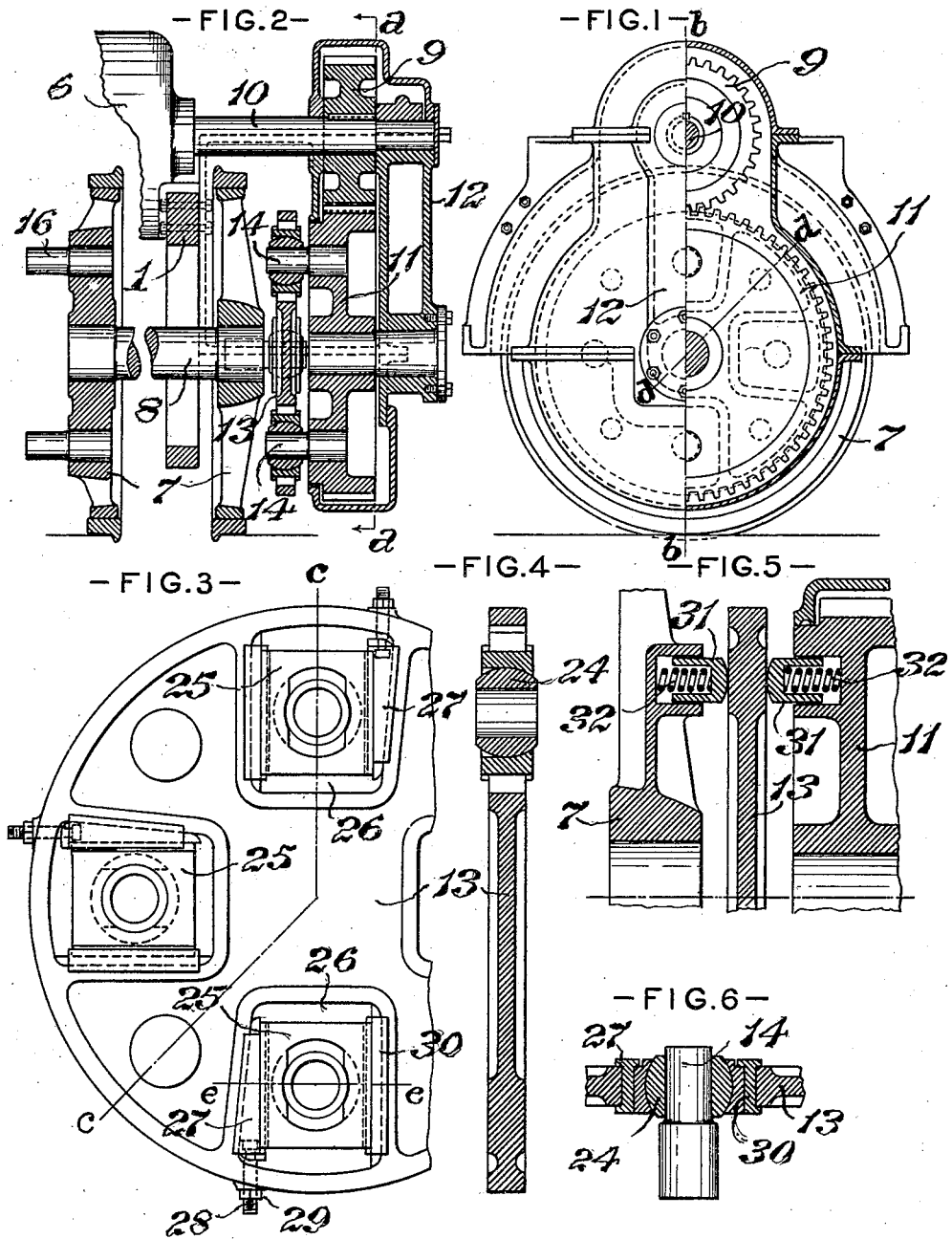

Jan. 14, 1930.  A. LIPETZ  1,743,363
MOTOR DRIVING CONNECTION FOR LOCOMOTIVES
Filed Aug. 2, 1928  2 Sheets-Sheet 2
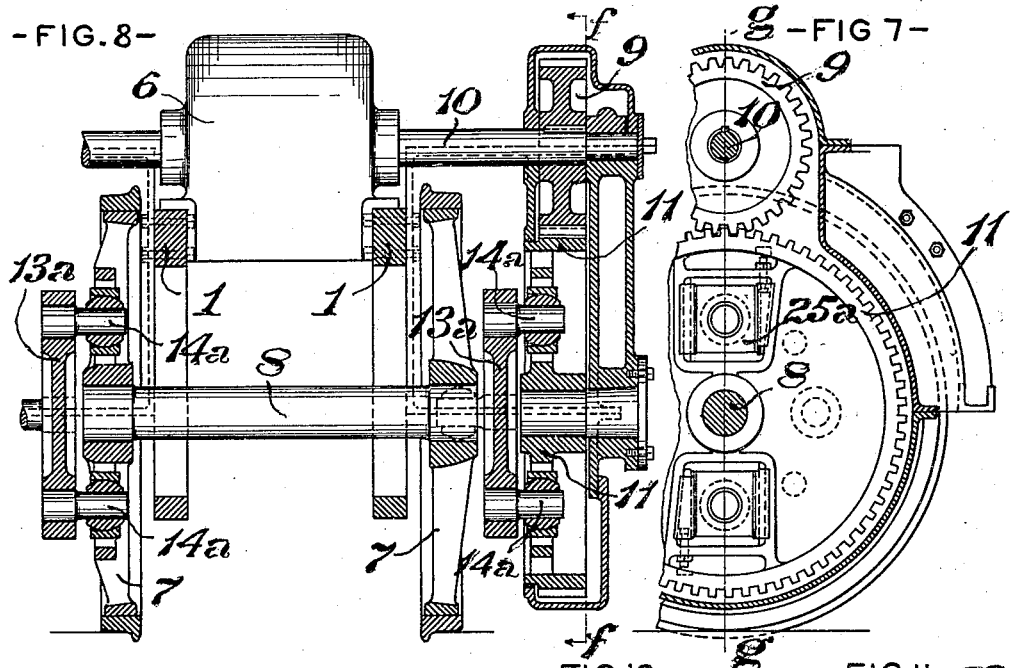
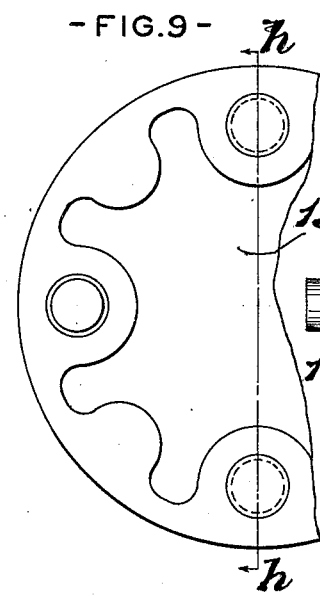
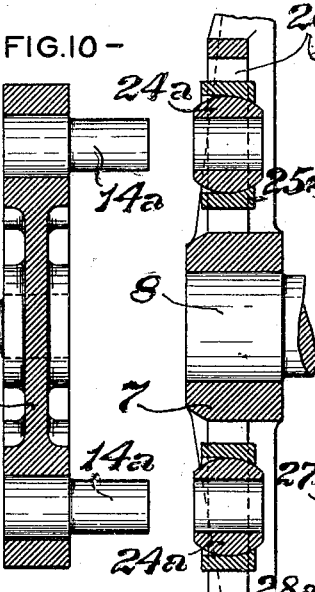
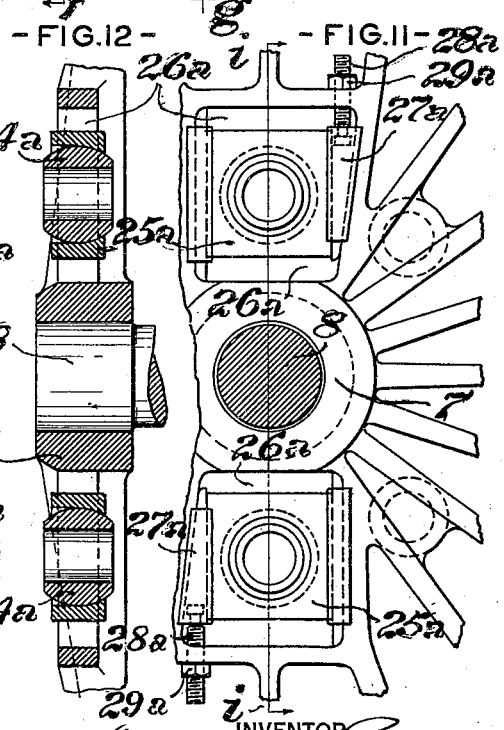
WITNESSES
A. S. Vanderbilt
J. S. Payne
INVENTOR
Alphonse Lipetz
by Snowden Bell
Atty.

Patented Jan. 14, 1930

1,743,363

UNITED STATES PATENT OFFICE

ALPHONSE LIPETZ, OF SARATOGA SPRINGS, NEW YORK

MOTOR-DRIVING CONNECTION FOR LOCOMOTIVES

Application filed August 2, 1928. Serial No. 296,958.

This invention relates, generally, to locomotives with electric transmission, and particularly to the driving mechanism thereof, and is an improvement upon that for which Letters Patent of the United States No. 1,653,364, were granted and issued to the applicant, Alphonse Lipetz, under date of December 20, 1927.

The object of the invention is to provide simple and effective means, readily applicable in connection with driving mechanism having the general characteristic features of that set forth in Letters Patent No. 1,653,-364 aforesaid, whereby wear may be taken up, as from time to time may become necessary or desirable.

The improvement claimed is hereinafter fully set forth.

In the accompanying drawings: Figure 1 is a view, half in side elevation and half in vertical section on the line $a$ $a$ of Fig. 2, of the driving mechanism of an electric locomotive, illustrating an application of the invention; Fig. 2, a vertical transverse section, on the line $b$ $b$ of Fig. 1; Fig. 3, a side view, in elevation and on an enlarged scale, of one of the power transmitting discs; Fig. 4, a transverse section through the same, on the line $c$ $c$, of Fig. 3; Fig. 5, a partial vertical section, on the line $d$ $d$ of Fig. 1; Fig. 6, a horizontal section on the line $e$ $e$ of Fig. 3; Fig. 7, a view, in vertical section, on the line $f$ $f$ of Fig. 8, illustrating a modification of structural detail; Fig. 8, a vertical transverse section, on the line $g$ $g$ of Fig. 7; Fig. 9, a side view, in elevation, of one of the power transmitting discs; Fig. 10, a transverse section through the same, on the line $h$ $h$ of Fig. 9; Fig. 11, a partial face view, in elevation, of one of the driving wheels, and; Fig. 12, a transverse section through the same on the line $i$ $i$ of Fig. 11.

In the practice of the invention, referring descriptively to the specific embodiment thereof which is herein exemplified, and first to Figs. 1 to 6 inclusive, the mechanism comprehends the following elements, viz; a motor, 6, of any suitable known construction, which is fixed upon a motor shaft, 10, journalled in a housing, 12, secured to the frame, 1, of the locomotive, a pair of driving wheels, 7, secured upon an axle, 8; and a gear wheel, 9, mounted on the motor shaft, adjacent to one of its ends and meshing with a gear wheel, 11. The gear wheel, 11, is located outside of the adjacent driving wheel, and is journalled for rotation in the lower end of the housing, 12. Power is transmitted from the gear wheel, 11, to the driving wheels, through a power transmitting disc, 13, which is interposed between the gear wheel and the adjacent driving wheel.

The power transmitting discs are, as in Patent No. 1,653,364 aforesaid, connected with the driving wheels, by pins, 14, projecting from the inner sides of the gear wheels, and fitting in bearings in the discs, 13, 11, and pins, 16, on the confronting faces of the driving wheels, fitting in similar bearings in the discs, there being two pins and their openings in one diameter of each disc, and two pins and their openings located in a diameter at a right angle thereto. The pins 14 and 16, are fitted in spherical bearings, 24, to permit slight angular oscillations in conformity with similar movements of the driving wheels. The pins are mounted for slight radial movement relative to the disc. and capacity for taking up wear due to this movement is provided by fitting said bearings in rectangular blocks, 25, which are mounted, and adjustable radially in, openings, 26, in the power transmitting discs, 13. Adjustment for taking up wear of each block may be effected when desired, by movement of a wedge, 27, interposed between one side of the block and the body of the disc, and having a screw, 28, on its outer end, engaged by an adjusting nut, 29. A shoe, 30, is interposed between the opposite side of the block and the disc.

In order to permit slight oscillations of the members on the ball bearings and maintain their proper relation, blocks, 31, are fitted in the confronting sides of the driving wheels and the gear wheels, 11, and are pressed outwardly against the interposed power transmitting discs, by springs, 32.

Figs. 7 to 12 inclusive illustrate a modification of structural detail, in which the members above described are combined in the same relation, and, without difference of operative principle, attain the same result by a reversal of the pins, 14$^a$, connecting the power transmitting discs, 13$^a$, with the driving wheels. Such reversal consists in fitting the bearings, 24$^a$, in blocks, 25$^a$, in openings, 26$^a$, in the adjacent gear, 11, and in the adjacent driving wheel, 7. Adjustment of the blocks is effected by wedges, 27$^a$, screws, 28$^a$, and nuts, 29$^a$, as in the instance first hereinbefore described.

While the invention is herein exemplified as applied in electric locomotives, it is equally applicable, without departure from its operative principle, in locomotives of other types, as internal combustion engine locomotives, turbine locomotives, etc., with electric transmission, as well as locomotives with motors other than electric, such as hydraulic, pneumatic, etc.

The invention claimed and desired to be secured by Letters Patent is:

1. In a driving mechanism for locomotives, the combination of a driving wheel; a motor driven gear wheel, rotatable substantially in line axially therewith; a power transmitting disc, interposed between the gear wheel and the driving wheel; pins, fixed in the gear wheel and the driving wheel, parallel with the axes thereof; blocks mounted in openings in the power transmitting disc; bearings, fitted in said blocks and receiving the pins; and means for effecting lateral adjustment of said blocks.

2. In a driving mechanism for locomotives, the combination of a driving wheel; a motor driven gear wheel, rotatable substantially in line axially therewith; a power transmitting disc, interposed between the gear wheel and the driving wheel; pins, fixed in the gear wheel and the driving wheel, parallel with the axes thereof; blocks mounted in openings in the power transmitting disc; spherical bearings, fitted in said blocks and receiving the pins; and means for effecting lateral adjustment of said blocks.

3. In a driving mechanism for locomotives, the combination of a driving wheel; a motor driven gear wheel, rotatable substantially in line axially therewith; a power transmitting disc, interposed between the gear wheel and the driving wheel; pins, fixed in the gear wheel and the driving wheel, parallel with the axes thereof; blocks mounted in openings in the power transmitting disc; bearings, fitted in said blocks and receiving the pins; wedges, fitted between said blocks and the body of the disc; and adjusting screws on said wedges, for taking up wear relatively to the disc.

4. In a driving mechanism for locomotives, the combination of a driving wheel; a motor driven gear wheel, rotatable substantially in line axially therewith; a power transmitting disc, interposed between the gear wheel and the driving wheel; pins, fixed in the gear wheel and the driving wheel, parallel with the axes thereof; blocks mounted in openings in the power transmitting disc; bearings, fitted in said blocks and receiving the pins; blocks, fitted in the confronting sides of the driving wheel and the gear wheel, and abutting on the power transmitting disc; and springs, exerting outward pressure in their seats on said blocks.

5. In a driving mechanism for locomotives, the combination of a driving wheel; a motor driven gear wheel, rotatable substantially in line axially therewith; a power transmitting disc, interposed between the gear wheel and the driving wheel; pins, fixed in the gear wheel and the driving wheel, parallel with the axes thereof; blocks mounted in openings in the power transmitting disc, and receiving the pins; and means for effecting lateral adjustment of said blocks.

6. In a driving mechanism for locomotives, the combination of a driving wheel; a motor driven gear wheel, axially spaced therefrom and rotatable substantially in line axially therewith; a power transmitting disc, disposed in said space between the gear wheel and the driving wheel; pins, fixed in the gear wheel and the driving wheel, parallel with the axis thereof; and non-rotatable blocks slidably mounted in openings in the power transmitting disc for receiving the pins.

7. In a driving mechanism for locomotives, the combination of a locomotive driving wheel member; a motor driven rotatable member axially spaced therefrom and rotatable substantially in line axially therewith for driving same; a power transmitting disc member disposed in said space between the rotatable member and the driving wheel member; and a plurality of axially extending pins, at least one of which connects the rotatable member and disc member, and at least one other of which connects the disc member and wheel member; a non-rotatable block on an end of each pin having engagement to permit relative movement between the engaging member of said end and the engaging member of the opposite end of the pin.

8. In a driving mechanism for locomotives, the combination of a locomotive driving wheel member; a motor driven rotatable member rotatable substantially in line axially therewith for driving same; a power transmitting disc member disposed between the rotatable member and the driving wheel member; a plurality of axially extending pins, at least one of which connects the rotatable member and disc member, and at least one other of which connects the disc member and wheel member, an end of each pin having engagement to permit relative movement between the engaging member of said end and the engaging member of the opposite end of the pin, means between the disc member and wheel member carried by one of said members and engaging the other of said members; and means between the disc member and rotatable member carried by one of said members and engaging the other of said members.

9. In a driving mechanism for locomotives, the combination of a locomotive driving wheel member; a motor driven rotatable member, rotatable substantially in line axially therewith for driving same; a power transmitting disc member disposed between the rotatable member and the driving wheel member; a plurality of axially extending pins, at least one of which connects the rotatable member and disc member, and at least one other of which connects the disc member and wheel member, an end of each pin having engagement permitting relative movement between the engaging member of said end and the engaging member of the opposite end of the pin, means between the disc member and wheel member carried by one of said members and engaging the other of said members; means between the disc member and rotatable member carried by one of said members and engaging the other of said members; and springs for maintaining said engagements spring pressed.

10. In a driving mechanism for locomotives, the combination of a locomotive driving wheel member; a motor driven rotatable member, axially spaced therefrom and rotatable substantially in line axially therewith for driving same; a power transmitting disc member disposed in the said space between the rotatable member and the driving wheel member; a plurality of axially extending pins, at least one of which connects the rotatable member and the disc member, and at least another of which connects the disc member and the wheel member; and a spherical joint connecting at least one of the pins to one of the two members connected by such pin.

11. In a driving mechanism for locomotives, the combination of a locomotive driving wheel member; a motor driven rotatable member, axially spaced therefrom and rotatable in line substantially axially therewith for driving same; a power transmitting disc member disposed in said space between the rotatable member and the driving wheel member; a plurality of axially extending pins, at least one of which connects the rotatable member and the disc member, and at least another of which connects the disc member and the wheel member; a spherical joint connecting at least one of the pins to one of the two members connected by such pin; and a radially slidable block connecting the spherically joined pin to one of the two members it connects.

ALPHONSE LIPETZ.